Aug. 18, 1970  C. A. MATTSON ET AL  3,525,002
ELECTRIC MOTOR STRUCTURE
Original Filed April 4, 1966  8 Sheets-Sheet 1

INVENTORS
CHARLES A. MATTSON
ALVIN ROMIN, JR.
ATTORNEY

Aug. 18, 1970   C. A. MATTSON ET AL   3,525,002
ELECTRIC MOTOR STRUCTURE
Original Filed April 4, 1966   8 Sheets-Sheet 5

INVENTORS
CHARLES A. MATTSON
ALVIN ROMIN, JR.
Robert W. Dudley ATTORNEY

Aug. 18, 1970 — C. A. MATTSON ET AL — 3,525,002

ELECTRIC MOTOR STRUCTURE

Original Filed April 4, 1966 — 8 Sheets-Sheet 7

INVENTORS
CHARLES A. MATTSON
ALVIN ROMIN, JR.

*Robert W. Dudley* ATTORNEY

INVENTORS
CHARLES A. MATTSON
ALVIN ROMIN, JR.

ATTORNEY

United States Patent Office 3,525,002
Patented Aug. 18, 1970

3,525,002
ELECTRIC MOTOR STRUCTURE
Charles A. Mattson, Oak Park, and Alvin Romin, Jr.,
Oak Lawn, Ill., assignors to Sunbeam Corporation,
Chicago, Ill., a corporation of Illinois
Original application Apr. 4, 1966, Ser. No. 539,706.
Divided and this application Oct. 16, 1968, Ser.
No. 768,032
Int. Cl. H02k 5/10
U.S. Cl. 310—88          5 Claims

ABSTRACT OF THE DISCLOSURE

A drive unit for an electrical appliance wherein an electric motor is enclosed in a sealed casing which also encloses a gear chamber. The motor includes a brush assembly which is adapted so that a conductor can be electrically connected to the brush assembly by inserting the conductor into an aperture in the assembly.

CROSS-REFERENCE TO RELATED APPLICATION

This is a division of application Ser. No. 539,706, filed Apr. 4, 1966.

BACKGROUND OF THE INVENTION

Power driven snow removal devices of a size useful to householder for removing snow from sidewalks, patios, porches, driveways, and the like have enjoyed increasing popularity. Many different types of snow throwers have been developed but generally all of those which are commercially available employ a rotatable impeller of some sort mounted in a housing and operable to pick up the snow in the path of the snow thrower and expel it upwardly and outwardly to one side or the other. Internal combustion engines have often been used as prime movers on snow throwers but these types of engines are sometimes difficult to start, especially in cold temperatures when the need for snow removal is generally the greatest. Recently, and as disclosed in Mattson et al. U.S. Pat. No. 3,267,594, granted Aug. 23, 1966, and assigned to the same assignee as the instant application, electric motors have been used as prime movers on snow throwers of this type and, while starting problems are nonexistent with electric motors, it is necessary completely to seal the motor and its associated electrical circuit because of the abundance of moisture and snow in the immediate vicinity of such motor and circuitry. Complete sealing of the motor and electrical system is necessary to insure safe operation of the snow thrower and, indeed, is necessary in order to secure approval for the device from the various consumer testing agencies. A completely sealed electric motor, however, presents a primary disadvantage in that adequate cooling is difficult to obtain, especially on motors which are relatively high in horsepower for their size. One means of cooling a completely sealed motor is to utilize the snow picked up by the snow thrower as a cooling agent. Such a snow thrower employing snow for cooling purposes is described and claimed in a copending United States patent application, now the above-mentioned Mattson et al. patent. The instant application is in the nature of an improvement on the device disclosed in such patent.

Accordingly, it is an object of the invention to provide an electric drive motor having a new and improved brush and armature assembly especially adapted for use with a motor in a sealed casing.

Further objects and advantages of the present invention will become apparent as the following description proceeds and the features of novelty which characterize the invention will be pointed out with particularity in the claims annexed to and forming a part of this invention.

BRIEF DESCRIPTION OF THE DRAWINGS

For a better understanding of the present invention, reference should be had to the accompanying drawings in which.

DESCRIPTION OF THE PREFERRED EMBODIMENT

Referring now to the drawings, there is illustrated and generally designated by the numeral 20 an apparatus for removing snow which embodies the present invention. The apparatus is commonly designated as an electric snow thrower because it is powered by an electric motor and, although not necessarily so limited in use, the snow thrower of the present invention is primarily desgned for use by householders for removing snow from sidewalks, driveways, porches and the like. Snow throwers of this type are generally designed to remove snow from a path of the order of sixteen, eighteen, twenty or so inches in width;

however, larger machines can be constructed to cover wider areas if desired.

The snow thrower 20 comprises essentially an impeller, auger, or worm designated generally as 21, and mounted for rotation in an impeller housing 22. The impeller 21 is rotated at the desired speed by an electric motor designated generally at 23 (FIGS. 6, 8 and 9) and, in accordance with the present invention, the motor is mounted in a completely sealed casing 24 disposed within the impeller housing 21 to provide for heat transfer between the casing and the snow and cold air created thereby.

Figures 1, 16, 17:
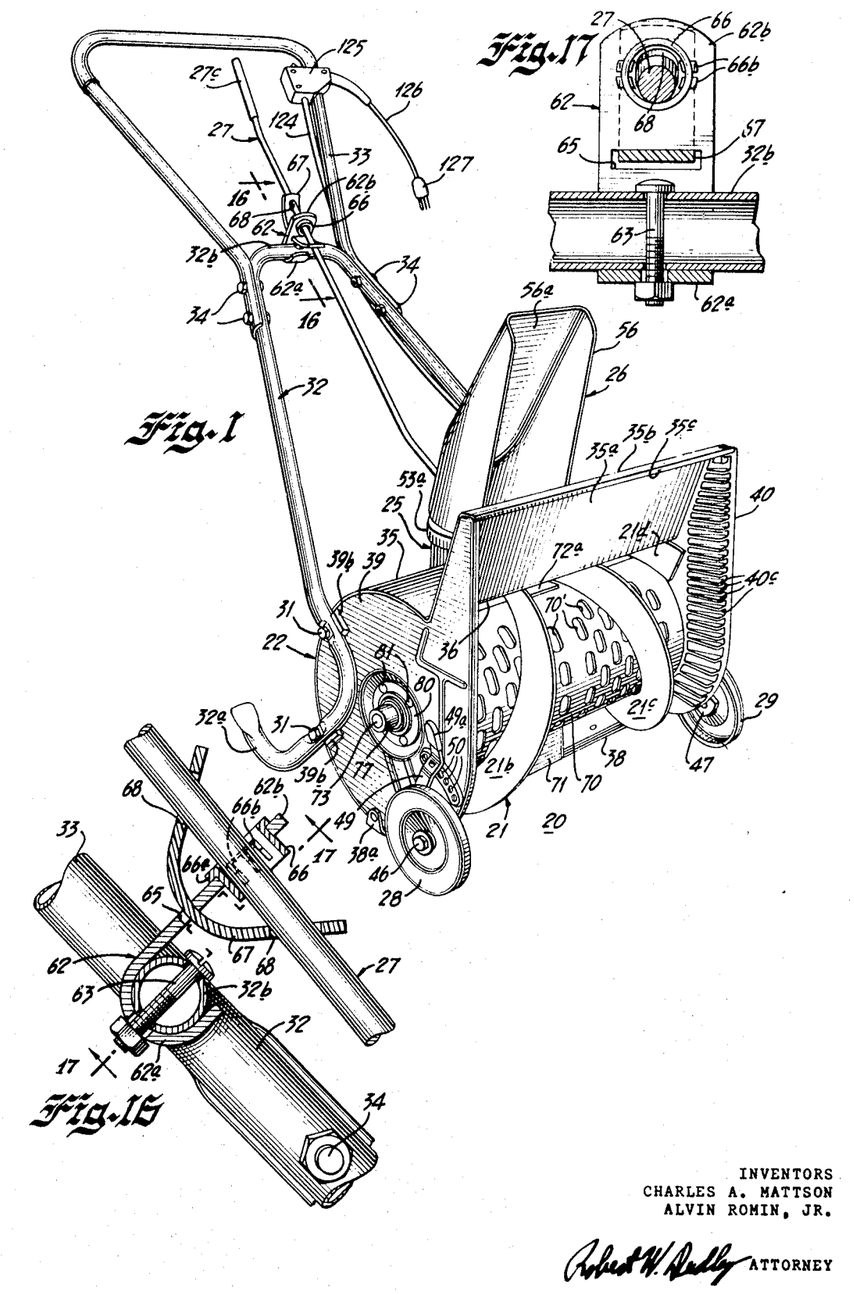
FIG. 1 is a perspective view of an electric snow thrower embodying the features of the present invention.
FIG. 16 is a fragmentary sectional view taken substantially along line 16—16 of FIG. 1 illustrating a portion of the handle and control mechanism for rotating the discharge chute.
FIG. 17 is a fragmentary sectional view taken substantially along line 17—17 of FIG. 16, assuming that FIG. 16 shows the complete structure.

To provide an entrance for snow, the impeller housing is open along the entire front side thereof, as best shown in FIG. 1, in order that the rotating impeller can directly engage the snow as the snow thrower is moved along a path. The snow entering the impeller housing through the large inlet opening on the front side is moved in the direction of the longitudinal axis of housing 22 by the action of the impeller 21 and is discharged or thrown upwardly from the housing through a discharge chute 25 centrally disposed between opposite ends thereof. A deflector assembly generally designated as 26 is connected to the upper end of the discharge chute 25 and is movable by means of a manually actuated control handle 27 (FIGS. 1, 15 and 16) to direct the discharge of snow to either side of the path traversed by the snow thrower. For supporting the snow thrower 20 for movement over the surface from which snow is to be removed, a pair of flanged-type wheels 28 and 29 are provided. Moreover, to guide and manipulate the snow thrower, there is also provided a handle member defined by a rearwardly and upwardly extending somewhat U-shaped tubular lower handle generally designated as 32 and a generally U-shaped tubular upper handle 33 joined as a unitary structure by a plurality of bolts 34 (FIG. 1). The lower handle member is secured to the ends of impeller housing 21 by suitable bolts 31. Preferably and as illustrated, the lower ends of lower handle 32 terminate in rearwardly extending skid portions 32a.

Considering now the details of the impeller housing 22, it is illustrated as comprising an elongated horizontally disposed sheet metal cylinder 35 defining an impeller chamber 36 therein. The cylinder 35 is discontinuous for a substantial angular portion thereof along the front side, and this discontinuous portion on the front side of the housing forms an enlarged inlet opening for receiving snow into the impeller chamber 36. In a device constructed in accordance with the invention, the cylinder 35 or cylindrical portion of the impeller chamber 36 covered an angular extent somewhat in excess of 180 degrees and had a diameter of approximately nine inches.

In order that the snow thrower 20 may be used in snow substantially deeper than the vertical dimension or height of the cylindrical portion 35 of impeller housing 22, the cylinder 35 is provided with an integral upwardly and forwardly extending back wall portion 35a and a narrow top wall 35b formed with a depending lip 35c along the forward edge thereof for stiffening purposes. The lip 35c effectively defines the upper edge of the opening or snow entrance to impeller chamber 36. The lower edge of the opening to impeller chamber 36 is defined by a rearwardly extending folded-over stiffening lip 35d and integrally formed from cylinder 35, to the underside of which is secured a scraper 38 which extends slightly forwardly of the lip 35d.

Figure 2:
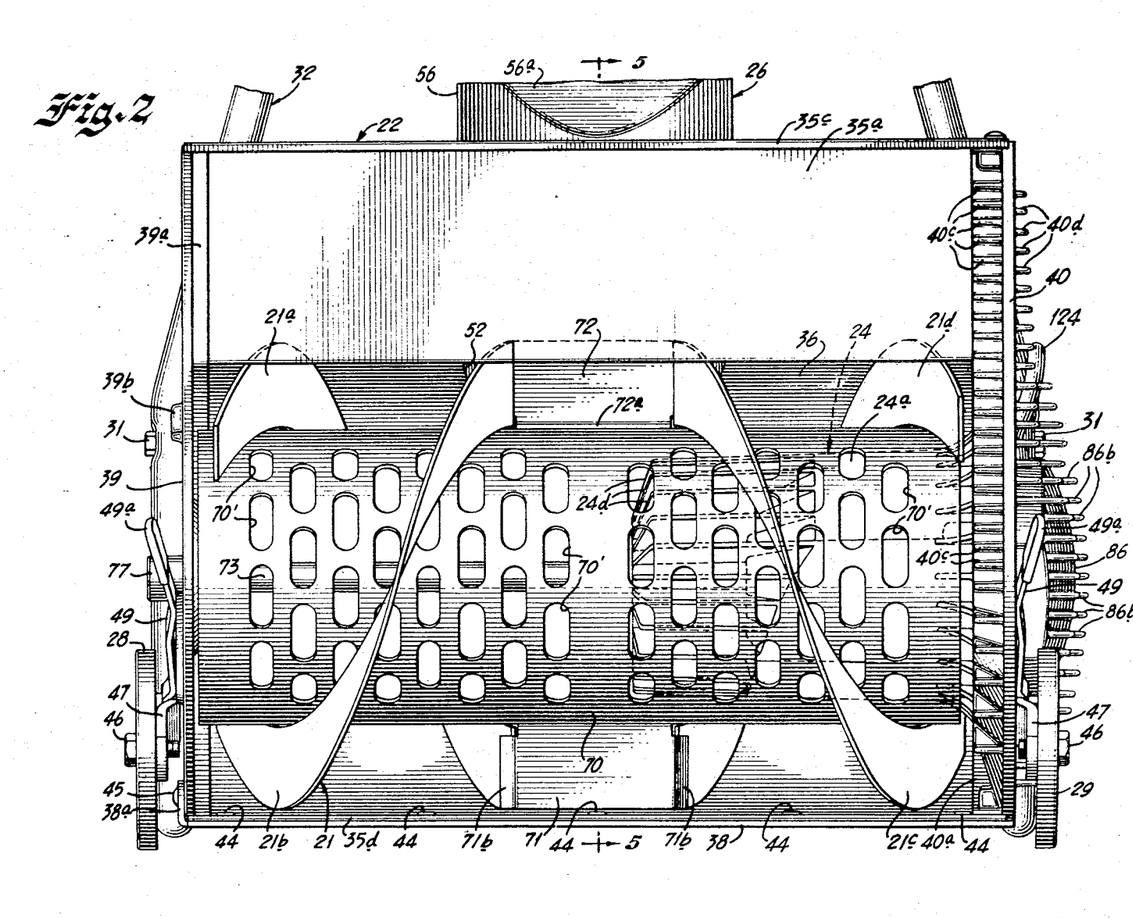
FIG. 2 is an enlarged fragmentary front elevational view of the snow thrower of FIG. 1 with upper portions of the handle and discharge chute broken off.
Figure 6:
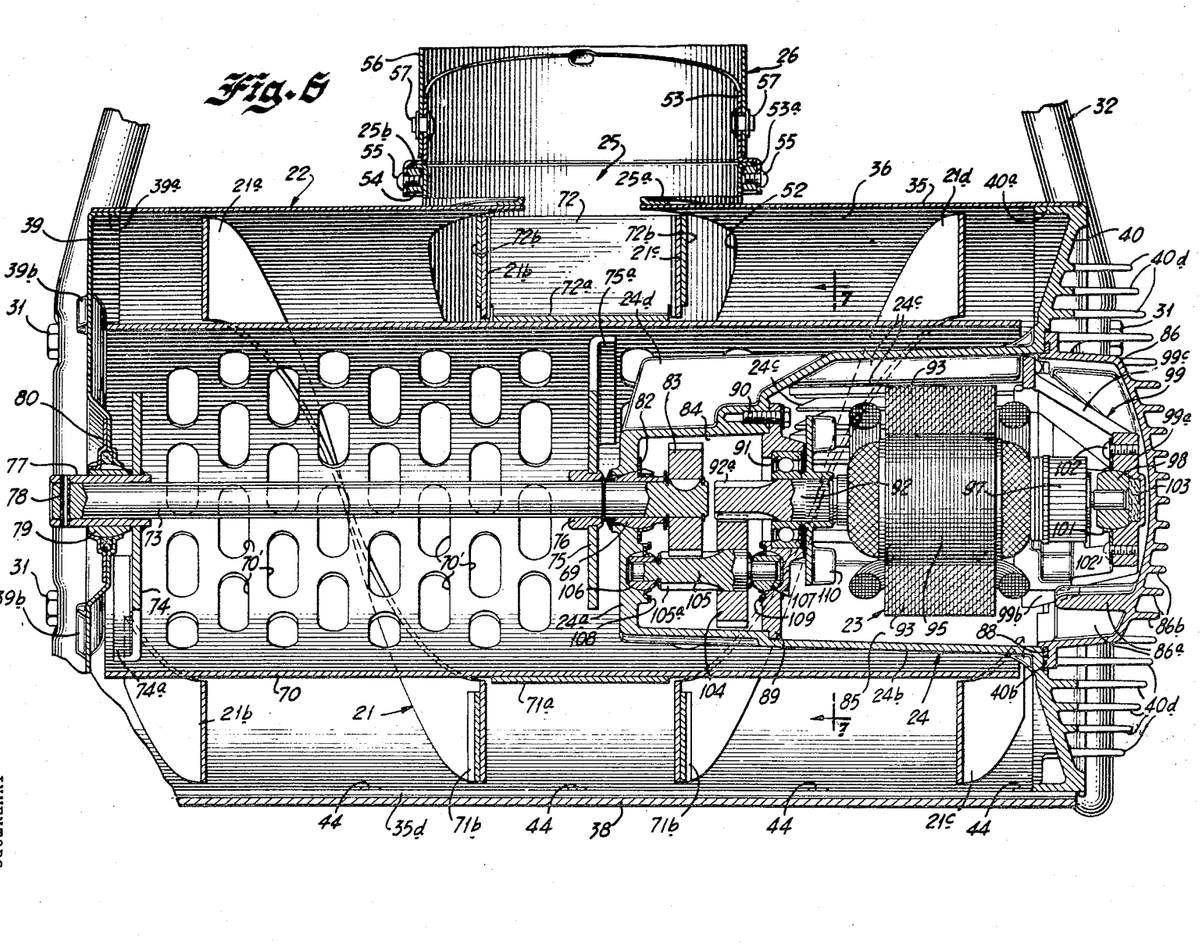
FIG. 6 is a sectional view taken substantially along line 6—6 of FIG. 5, assuming that FIG. 5 shows the entire construction.

To complete impeller housing 22 the opposite ends of the cylinder 35 are closed by a pair of end walls 39 and 40. In a device built in accordance with the present invention, the end wall 39 was constructed of a sheet metal stamping and the end wall 40 was formed as a die casting. However, it should be understood that the manufacturing details of these end walls could vary widely. Preferably, the end wall 39, which is shaped to completely enclose one open end of impeller chamber 36, includes an inwardly extending peripheral flange 39a, best shown in FIGS. 2 and 6, which engages the interior surface of the cylinder 35 as well as the interior of wall portions 35a and 35b and is secured thereto by any suitable means such as spot welding, riveting or the like. The cast end wall 40 also includes an inwardly extending peripheral flange 40a (FIG. 6), and this end wall is preferably secured to the cylinder 35 as well as wall portions 35b by a plurality of bolts 41 (FIG. 3) so that it may be removed completely from the wall member when desired. The bolts 41 are threaded into nuts 42 which are positioned within appropriate recesses 43 formed in the end wall 40 at spaced-apart locations around the periphery thereof. The end of the scraper blade 38 adjacent the end wall 40 is secured in place by one of the bolts 41 and its nuts 42 (FIG. 3), and the portion of the scraper blade 38 between end walls 39 and 40 is permanently affixed to the lower edge of stiffening lip 35d by a plurality of rivets 44 (FIGS. 2 and 6). The other end of the blade 38 is formed with an upturned lug 38a (FIGS. 1, 2 and 4) which is permanently secured to the outer surface of the end wall 39 by a single rivet 45.

From the above description it will be apparent that the impeller housing 22 is defined by the cylinder 35 including portions 35a, 35b and 35c and end walls 39 and 40 whereby the front of the housing is provided with a relatively large rectangular opening. This opening is defined at the top by the depending lip 35c, at the bottom by the scraper blade 38, and at the sides by the forwardly facing edges of the end walls 39 and 40.

As previously mentioned, the housing 22 is supported by wheels 28 and 29 which are illustrated as having a very narrow tread so that they will easily cut through the snow and permit the scraper blade 38 to move in close contact with the ground or other surface on which the snow to be removed is disposed. In order selectively to adjust the distance between the scraper blade 38 and the surface from which snow is to be removed, each wheel 28 and 29 is provided with suitable bearings rotatably mounted on an associated bolt-type axle 46 (FIGS. 3, 4 and 13) projecting outwardly from and secured to an associated wheel supporting bracket 47. The brackets 47 are mounted for pivotal movement on the respective end walls 39 and 40 whereby pivotal movement thereof will result in the wheels being raised or lowered with respect to the impeller housing 22. It will be appreciated that the snow thrower 20 may be used to remove snow from a smooth surface, such as a sidewalk, as well as from rough surfaces, such as a driveway covered with crushed stone or similar material. In the latter case it is desirable that the lower edge of the scraper blade 38 be raised sufficiently so that stones or other material on the surface being cleaned of snow are not picked up by the impeller 21.

Figure 3:
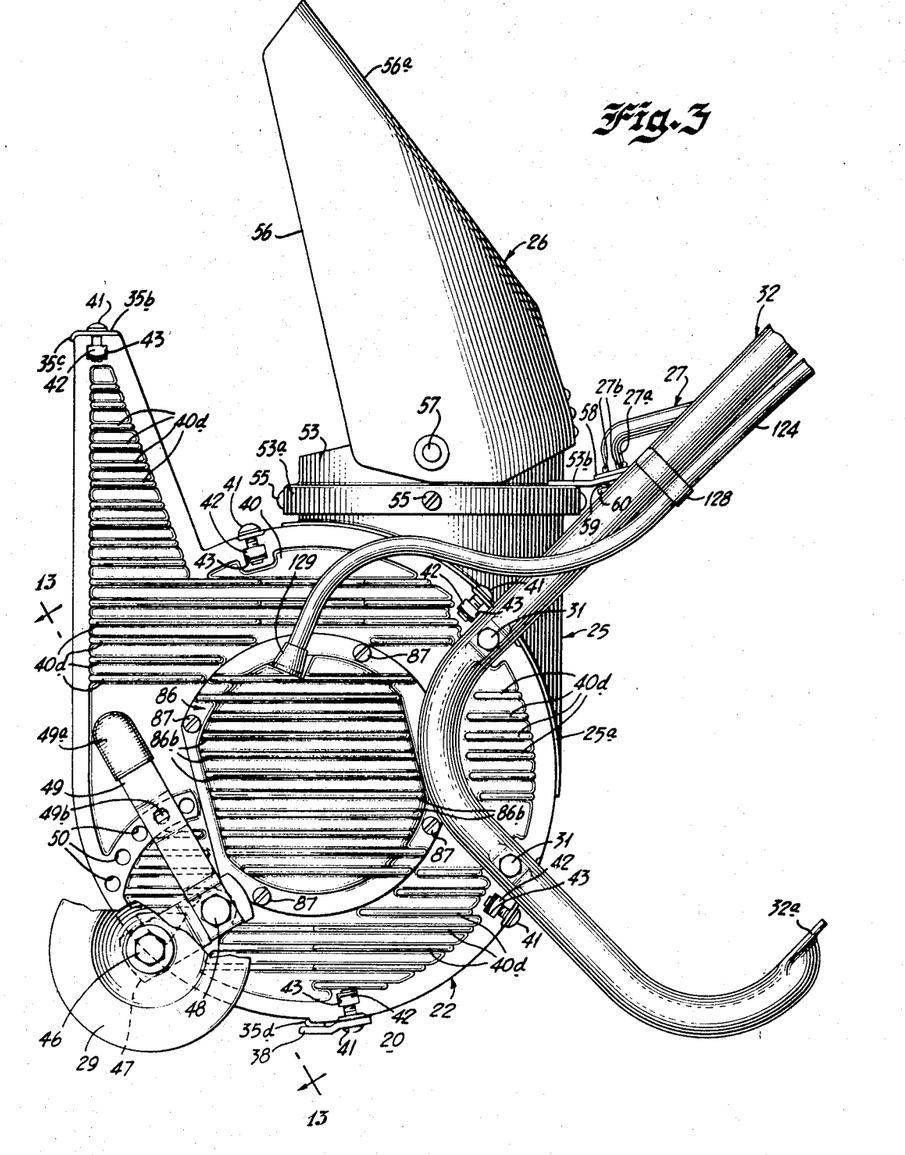
FIG. 3 is a right end elevational view of the snow thrower as viewed in FIG. 2.
Figures 4, 15:
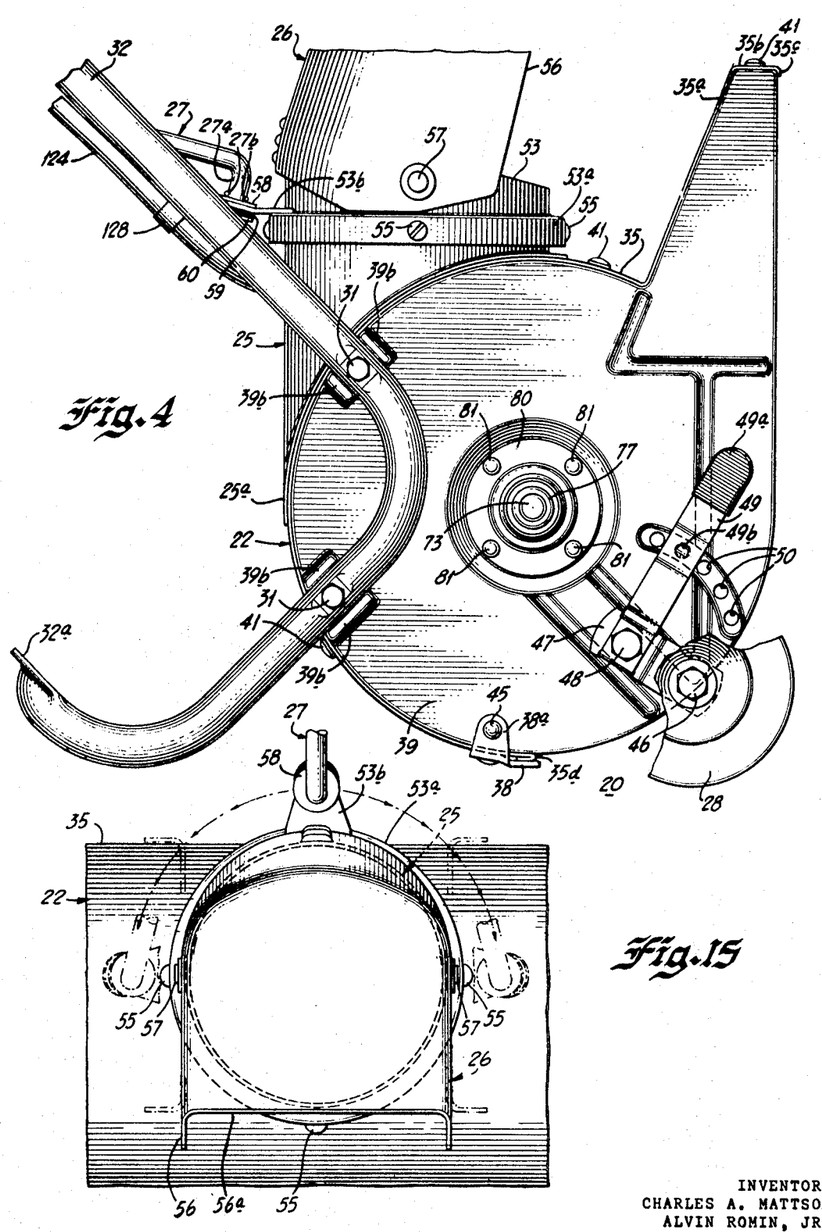
FIG. 4 is a left end elevational view of the snow thrower as viewed in FIG. 2.
FIG. 15 is a fragmentary top plan view of a portion of the snow thrower illustrating a portion of the impeller housing, discharge chute and chute rotating mechanism.
Figure 13:
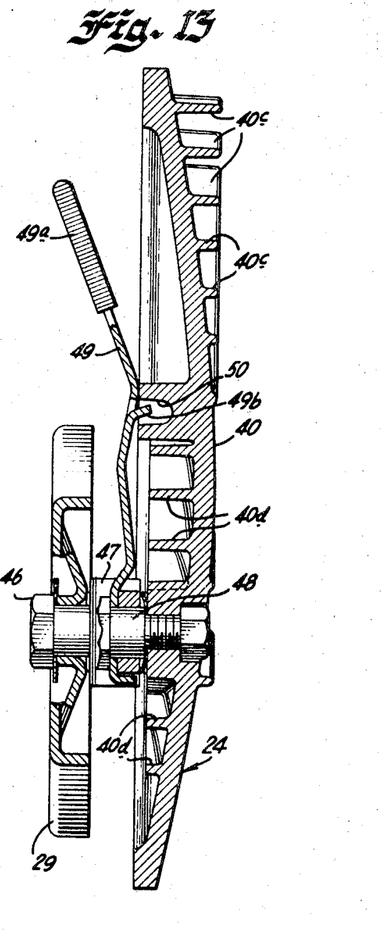
FIG. 13 is a sectional view taken substantially along line 13—13 of FIG. 3 illustrating in detail an end wall of the impeller housing and a wheel mounted thereon.

For pivotally relating each wheel bracket 47 to its respective end wall 39 or 40, suitable pivot pins 48 (FIGS. 3, 4 and 13) are provided. Moreover, to readily manipulate each bracket an operating arm or lever 49 is provided, preferably having a plastic grip 49a at the end to facilitate manipulation thereof. To hold each bracket 47 in any one of a plurality of selected positions, each lever arm 49 is provided with an inwardly extending locating lug or projection 49b (FIG. 13) for engaging suitable means secured to or defined in the end wall on which the arm is mounted. As illustrated in FIGS. 3, 4 and 13, each end wall 39 and 40 is formed with means defining a plurality of spaced indentations 50 on the outer surface thereof to receive the projecting lugs 49b of the respective lever arms. The indentations are arranged in an arcuate pattern relative to the pivot pins 48 and provide for a number of different wheel heights for the snow thrower 20. As illustrated in FIGS. 3 and 4, the lugs 49b are engaged within the next to the uppermost indentations 50 in the respective end walls and, consequently, the respective wheels 28 and 29 are in their next to uppermost positions, i.e. the blade 38 is spaced relatively close to the ground. If the lever arms 49 were moved, however, so that the projecting lugs 49b are engaged in the lowermost indentations 50 on the respective end walls 39 and 40, the wheels 28 and 29 will then be in their lowest position and the scraper blade 38 will be raised to the maximum position above the ground. By providing a number of spaced-apart indentations 50, as illustrated, various wheel height selections in between an uppermost and lowermost position can be obtained.

For the purpose of changing the wheel positions, the grip portions 49a of the arms are deflected outwardly away from the end walls until the projecting lugs 49b are out of engagement with the indentations 50 and the arms are then pivoted in either a clockwise or counter-clockwise direction about the pins 48 until the desired position is obtained. When the tips 49a of the arms are released, the projecting lugs 49b move inwardly toward the end walls to hold the wheels at a selected level and lock the arms in the selected indentations 50.

It will be understood that the rearwardly extending skids 32a together wtih the wheels 28 and 29 determine the clearance between the scraper blade 38 and the surface from which the snow is to be removed. As mentioned above, the skids 32a are integrally formed at the ends of the U-shaped lower handle 32, and the handle and skids are removably secured to the end walls 39 and 40 by the bolts 31, as best shown in FIG. 1, 3 and 4. As illustrated, the sheet metal end wall 39 is provided with two pairs of outwardly extending spaced parallel projections or lugs 39b (FIG. 4) which aid in positioning the handle 32 with respect to this end wall. Similarly, the end wall 40 is provided with means to aid in positioning lower handle 32 relative thereto.

Figures 5, 7:
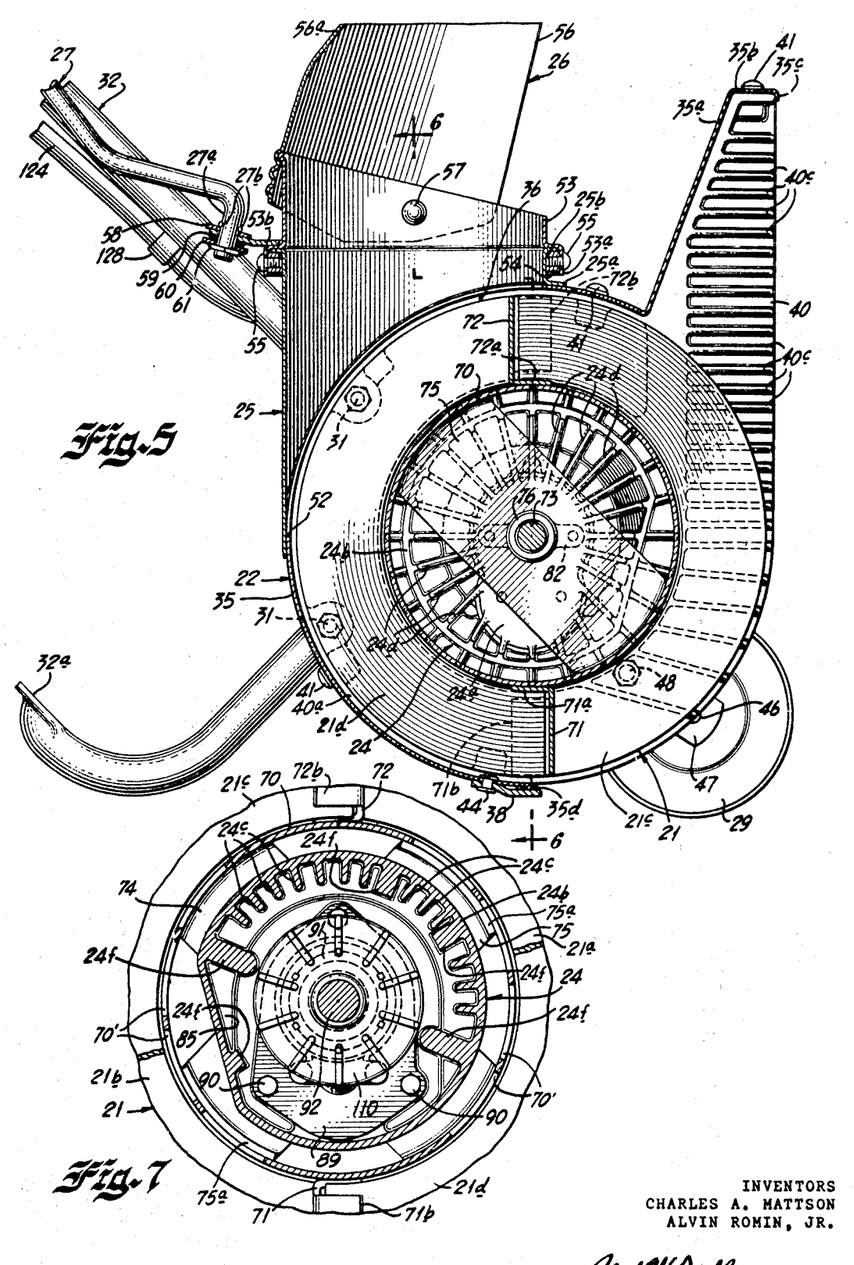
FIG. 5 is a sectional view of the snow thrower taken substantially along line 5—5 of FIG. 2.
FIG. 7 is a fragmentary sectional view through the sealed motor casing of the snow thrower taken substantially along line 7—7 of FIG. 6, assuming that FIG. 6 shows the complete structure.

In order that the snow may be discharged from the housing 22 upwardly into the discharge chute 25, a discharge opening 52 is defined in the upper portion of cylinder 35, as best shown in FIGS. 5 and 6. The opening 52 is disposed midway between the end walls 39 and 40 and is located in the upper rear portion of the cylinder 35. The discharge chute 25 extends vertically upward from the opening 52 and includes a lower flange 25a which is preferably joined to the cylinder 35 by spot welding or the like. The upper end of the discharge chute 25 is provided with an outwardly extending peripheral flange 25b (FIGS. 5 and 6) for supporting a base member 53 of the deflector assembly 26. The base member 53 is effectively a short rotatable extension of chute 25 (FIGS. 3, 4 and 5). As illustrated, the lower end of the base member 53 is formed with a short cylindrical enlargement 53a for securing therein the flange 25b of the discharge chute 25 to the extent that the shoulder formed by the enlargement 53a rests on the flange 25b. A retaining ring 54 formed of a suitable low friction plastic material is disposed within the enlargement 53a beneath the flange 25b and secured thereto by suitable screws 55. This retaining ring interlocks the discharge chute 25 and base member 53 together without interfering with relative rotation between them.

For the purpose of directing snow discharge from the chute 25 in a desired selected direction, the deflector assembly 26 includes a deflector 56 pivotally mounted to the base member 53 by a pair of horizontally extending rivets 57. The deflector 56 is of generally U-shaped cross section and open along its front, as viewed in the position shown in FIG. 1. It includes a sloping back wall portion 56a so that snow will be deflected with a horizontal component as it moves upwardly through the deflector assembly 26. The base member 53 and deflector portion 56 defining deflector assembly 26 are rotatable about the vertical axis of the discharge chute 25 whereby snow passing out of the discharge chute may be directed or thrown in any angular direction through 180 degrees of movement of deflector assembly 26 as clearly shown in FIG. 15 of the drawings.

To control the rotation of the deflector assembly 26, the base member 53 is provided with a rearwardly extending actuating arm or lug 53b (FIGS. 3, 4 and 5) provided with a suitable opening therein pivotally to receive a lateral extension 27a from the forward end of the rodlike control handle 27. A pair of integral projections or ears 27b are formed on the control rod to limit the maximum insertion of lateral extension 27a into the opening in lug 53b. Preferably a washer 58 is mounted above the lug 53b beneath the ears 27b, and a lock washer 59 and washer 60 are provided on the underside of the lug to provide a free swivel connection between the control rod 27 and the base member 53. A cotter pin 61 extending through an opening in the end of lateral extension 27a keeps the parts in the assembled relationship shown.

So that the control rod 27 may readily be actuated by the user to pivot deflector assembly 26, rod 27 extends rearwardly and upwardly above the bight portion 32b of U-shaped lower handle 32 (FIGS. 1 and 16) terminating in a hand grip portion 27c. To support the upper end of control rod 27 and guide its movement, there is provided a J-shaped bracket 62 secured to the bight portion 32b by means of a suitable bolt 63 (FIG. 16). As illustrated, J-shaped bracket 62 includes a lower curved portion 62a partially encircling bight portion 32b and an upstanding leg 62b having a circular bushing receiving aperture and a rectangular opening 65 therein. An annular low friction bushing 66 having a flange 66a at one end is mounted in the circular aperture and the control rod 27 extends through and is slidably disposed in this bushing. Preferably, the bushing is formed of plastic material such as nylon or the like, and is held in place in the aperture by means of the flange 66a and a plurality of outwardly extending ears 66b (FIGS. 16 and 17).

For the purpose of selectively holding control rod 27 and hence deflector assembly 26 in any preselected position, a latching means in the form of a flexible strap 67 of plastic material is mounted in the rectangular opening 65 to extend on both sides of the J bracket 62. This strap 67 is provided with openings 68 near the ends thereof and the strap is bent into a U-shaped configuration (FIG. 16) so that the control rod 27 passes through these openings. The inherent resilience of the strap 67 tends to straighten it out and, accordingly, the ends thereof exert forces transverse to the longitudinal axis of the rod 27 tending to hold the rod against the one side of the bushing 66. These forces exerted by the ends of the strap 67 on the rod 27 tend to restrict longitudinal movement of the rod and maintain it in any selected position.

Referring to FIG. 15 of the drawings, the control rod 27 may be manipulated so that the deflector assembly 26 will throw or disperse a stream of snow to either side or straight ahead of the path traversed by the snow thrower 20. The solid lines of FIG. 15 illustrate the deflector 56 facing forwardly of the snow thrower to throw the snow directly ahead. By manipulating the control end 27c of the rod 27, the forward end 27a can be moved to the right or left of center and the deflector assembly 26 is thus made to pivot about the vertical axis of the discharge chute 25. The dotted lines in FIG. 15 illustrate the deflector assembly 26 in position to the right and left of center for deflecting the snow stream to one side or the other. Once the deflector assembly 26 is positioned to deliver the snow stream in the desired direction, the friction strap 67 will maintain the control rod 27 in a position and, hence, the deflector assembly 26 is held in any selected position. From the foregoing it can be seen that the control rod 27 provides a convenient means for manipulating the deflector assembly 26 to rotate about the axis of the discharge chute 25 thereby to deliver the discharge stream of snow in the desired direction.

For the purpose of moving the snow within the impeller chamber 36, the impeller 21 is provided as mentioned above. As illustrated, this impeller effectively comprises a pair of augers defined by helical flights 21a, 21b, 21c and 21d secured to the exterior of a rotatable perforated cylinder or drum 70 whose longitudinal axis is concentric with the longitudinal axis of cylinder 35. A substantial portion of drum 70 surrounds motor casing 24 and the longitudinal axis of the casing is coaxial with the drum axis, the perforations 70' in drum 70 are positioned so as not to upset the balance when rotating at high speed. Referring to FIGS. 2 and 6 of the drawings, the flights 21a and 21b may be termed as right-hand because, as the cylindrical drum 70 is rotated about its axis (clockwise in FIG. 5), these flights move the snow that enters the housing adjacent the end wall 39 in a direction towards the central or midportion of the impeller housing 22. Similarly, the flights 21c and 21d which are secured to the portion of drum 70 surrounding casing 24 may be termed lefthand because, as the drum 70 is rotated in the indicated direction, these flights also move the snow adjacent end wall 40 toward the midportion of the housing 22. To cause the snow reaching the center part of the housing 22 to move out through the discharge chute 25, the flights 21a and 21d are joined together at their inner ends by a short thrower section 71, and the flights 21b and 21c are joined together at their inner ends by a similar short thrower section 72. These thrower sections 71 and 72, upon rotation of drum 70, throw the snow at high speeds into discharge chute 25 where it is properly directed by deflector assembly 26.

In a device built in accordance with the present invention the thrower sections 71 and 72 were provided with drum engaging lateral flanges 71a and 72a (FIG. 5) secured to the drum or cylinder 70 by spot welding or the like. The thrower sections 71 and 72 also included end tabs 71b and 72b, respectively, which are secured to the adjacent ends of the respective helical flights by spot welding or the like. Because the flights 21a and 21b move the snow in a direction opposite to that of the flights 21c and 21d, there is little or no resultant endwise thrust on the impeller 21. This is a distinct advantages over an impeller having only unidirectional flights in that thrust bearings for mounting the impeller are not required.

In order to support and rotatably drive the impeller 21, a drum drive axle 73 is mounted in the impeller housing 22 coaxial with the longitudinal axes of the drum 70 and impeller chamber 36. One end of the drive axle 73 is journalled in a suitable bearing 69 (FIG. 6) supported in the end wall 24a of sealed motor casing 24, while the other end of axle 73 extends through a suitable opening in the end wall 39 and is supported by that end wall, as described hereinafter. For the purpose of relating drum 70 to axle 73, a pair of spaced drum supports 74 and 75 (FIGS. 5 and 6) are provided which have center openings to accommodate axle 73 and curved lateral flanges 74a and 75a at the ends conforming with the inside of drum 70, which flanges 74a and 75a are suitably secured to the drum as by spot welding or the like whereby the supports 74 and 75 are integrally related to the drum and effectively are part of impeller 21. Drum support 75 is positioned adjacent casing end wall 24a and is provided with a central hub 76 freely rotatable on axle 73. Drum support 74, on the other hand, is positioned at the end of the drum 70 adjacent end wall 39 and is secured as by welding or the like to an elongated tubular central sleeve or hub 77 projecting in part to the outside wall 39 and surrounding a length of axle 73 also extending to the outside of wall 39.

For the purpose of drivingly relating axle 73 and drum 70, tubular sleeve 77, which is loosely fitted on the drive axle 73, is keyed to rotate therewith by means of a transverse shear pin 78 (FIG. 6) which extends through the concentrically arranged axle 73 and sleeve 77. Should an object or impediment of some kind become jammed between the cylinder 35 defining impeller housing 22 and the impeller 21, the shear pin 78 will preclude damage to the snow thrower 20. When pin 78 is sheared, the drive axle 73 can turn freely without rotation of impeller 21 until the motor 23 is deenergized and the object or impediment removed. As illustrated best in FIGS. 4 and 6 of the drawings, sleeve 77 and hence the end of axle 73 adjacent end wall 39 are journalled in a suitable bearing 79 held in end wall 39 by a bearing retainer 80 secured thereto by any suitable means such as rivets 81 (FIG. 4). Suitable lubrication means such as an oil wick are preferably provided for bearing 79. A bearing retainer 82 (FIGS. 5 and 6) is secured to the inside of casing wall 24a to hold bearing 69 in position in end wall 24a.

To supply a driving torque to drum 70 and, consequently, to impeller 21, a suitable gear 83 (FIG. 6) is secured to the end of axle within sealed casing 24 and this torque is delivered through the axle 73, shear pin 76, sleeve 77 and drum support 74 to the end of drum 70 adjacent end wall 39. The drive axle 73 acts in a manner similar to a torsion bar and absorbs many of the shock loads encountered by the impeller 21, which are then transmitted to the outer end of the axle 73. Should the impeller encounter a momentary heavy load, some of the shock energy is absorbed by the torsional twisting or deflection of the drive axle 73, and the shock load transmitted to the motor 23 and interconnecting drive means is reduced.

Figure 8:
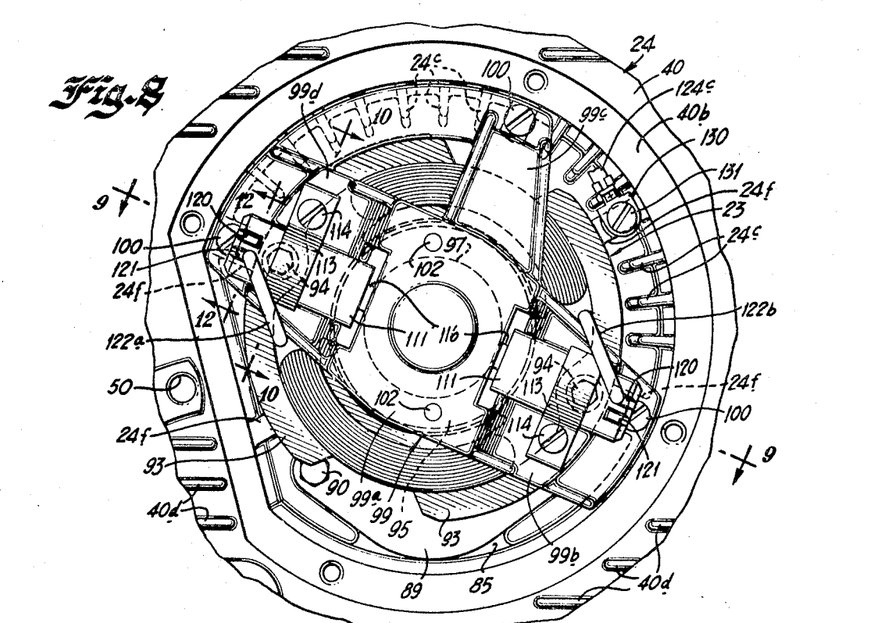
FIG. 8 is an enlarged fragmentary view of FIG. 3 with a detachable cover removed to illustrate the interior of the sealed motor casing.
Figure 9:
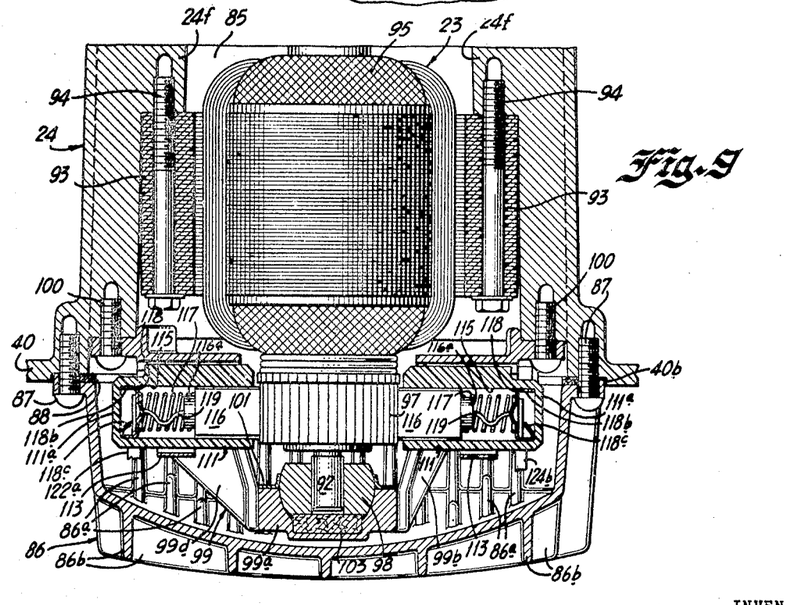
FIG. 9 is a sectional view taken substantially along line 9—9 of FIG. 8 but with the detachable cover member in place as in FIG. 3 of the drawings.

An important feature of the present invention resides in the arrangement of the sealed motor casing 24 within the impeller housing 22 so as to be cooled by snow entering and moving through the impeller chamber 36. To this end sealed casing 24 is preferably a cup-shaped casting, cast integrally with end wall 40, as best shown in FIGS. 6, 8 and 9. Because the casing 24 is positioned within the perforated cylindrical drum 70 of the impeller 21, it is in excellent heat transfer relation with the snow that enters the impeller housing 22. The snow may pass through the perforations 70' in the drum 70 and come in direct contact with the outer surface of the casing 24, producing a good cooling effect on the casing. The sealed casing 24 in addition to the end wall 24a includes a tubular sidewall 24b which projects inwardly from the end wall 40 toward the central or midportion of the impeller chamber 36 and which is closed by the inner end wall 24a. Casing 24 defines at its inner end a gear chamber 84 housing gear 83 among others described hereinafter and a motor chamber 85. The outer end of the tubular wall portion 24b of sealed casing 24 is open to afford access to chambers 84 and 85 and is adapted to be sealingly covered by a removable cover member 86 which is secured to the end wall 40 by a plurality of cap screws 87 (FIGS. 3 and 9). In order to insure tight sealing between the cover member 86 and the outer end of casing 24, a sealing gasket 88 (FIGS. 6 and 9) is mounted within an annular recess formed in the cover and the gasket is pressed into sealing engagement against a corresponding annular surface 40b provided on the outer face of the end wall 40 around the open of the sealed casing 24.

To insure good heat transfer and as illustrated in FIGS. 5, 6, 7 and 8 of the drawings, the tubular sidewall 24b of the sealed casing 24 is somewhat irregularly shaped and includes a plurality of integral internal cooling fins 24c and a plurality of integral external cooling fins 24d (FIGS. 2, 5 and 6), the latter being in direct heat transfer relation with the snow and air cooled by the snow in the impeller housing 22 to provide a maximum cooling effect. Similarly, the removable cover member 86 is formed with both internal and external cooling fins 86a and 86b, respectively (FIGS. 9 and 14), and the end wall 40 is cast to include a row of fins 40c (FIGS. 1 and 5) which extends into the impeller housing 22 for direct cooling contact with the snow and a plurality of cooling fins 40d (FIGS. 2, 3, 6, 8 and 13) on the outer face thereof. The heat generated by operation of the motor 23 is transferred to the casing 24 and integral end wall 40 and to the cover member 86 by conduction, and is dissipated from these members by means of the external fins 24d and 40c which are in contact with the snow or cold air created by the snow in the impeller housing 22 and the fins 40d and 86b which are in contact with the air or snow outside of the impeller housing. It will be understood that in removing snow the external fins 40d and 86b will divertly contact the snow whenever end plate 40 is adjacent the area from which snow is being removed. The internal fins 24c and 86a aid in conducting heat from the air or other fluid within the sealed casing 24 and distributing the heat to the outer surfaces and external fins of the casing 24, end wall 40 and cover member 86.

Figure 10:
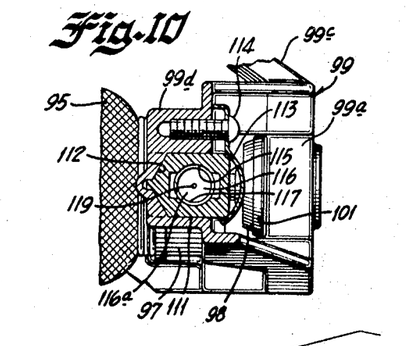
FIG. 10 is a fragmentary sectional view taken substantially along line 10—10 of FIG. 8 more clearly to illustrate a brush assembly for the electric motor of the snow thrower.

For the purpose of separating the gear chamber 84 from the motor chamber 85 within sealed casing 24, there is provided a divider and bearing supporting wall or plate 89 (FIGS. 6 and 7). The plate 89 is secured in place against an internal shoulder defined in casing 24 by means of a plurality of removable cap screws 90. The plate 89 is formed with a central opening for supporting a motor bearing 91 within which the inner end of an armature shaft 92 of the motor 23 is journalled. The motor 23 is mounted within the motor chamber 85 and includes a laminated stator 93 which is secured to the ends of a pair of diametrically opposed ribs 24f (FIGS. 7 and 9) by a pair of cap screws 94. The motor includes an armature 95 mounted on the shaft 92. Electric power is supplied to the armature 95 by a commutator 97 adjacent the outer end of the rotor shaft 92. A commutator end motor bearing 98 is suitably mounted in a recess formed in a bracket 99 having a central hub 99a and a plurality of outwardly extending arms 99b, 99c and 99d, the outer ends of which arms are bolted to the interior of the casing by a plurality of bolts 100 (FIGS. 8 and 9). A suitable bearing retainer 101 (FIGS. 6, 9 and 10) and screws 102 hold bearing 98 in place in hub 99a. An oil wick 103 is mounted within the bearing recess in the bracket hub 99a for lubricating bearing 98.

In order to drive the impeller 21 from the motor 23, the inner end of the motor shaft 92 which projects into the gear chamber 84 is formed with a plurality of splines or drive teeth 92a for drivingly engaging the teeth on a gear 104 mounted on a jack shaft 105 in the gear chamber 84 (FIG. 6). The gear 104 is larger in pitch diameter than the toothed portion 92a of the armature shaft and, hence, the shaft 105 rotates at speed reduced from that of the motor 23. The jack shaft 105 is parallel with the drive axle 73 and armature shaft 92 and is supported at opposite ends in the gear chamber 84 by a pair of bearings 106 and 107. The bearing 106 is seated in a recess formed on the inner surface of the casing end wall 24a, and a bearing retainer 108 is provided to hold this bearing in place. The bearing 107 is mounted in an oppositely facing recess formed in the dividing wall 89, and this bearing is held in place by a bearing retainer 109. The jack shaft 105 is provided with a plurality of splines or drive teeth 105a which mesh with the gear 83 secured to the end of the drive axle 73 within gear chamber 84. A further reduction in speed is accomplished between the jack shaft 105 and drive axle 73 because of the difference in pitch diameter between the teeth 105a and gear 83.

The plate 89 effectively seals the gear chamber 84 from motor chamber 85 so that the gear chamber can be filled with a lubricating fluid which is circulated therein by virtue of the rotation of the gears and shafts in gear chamber 84. Suitable seals are provided for preventing moisture from entering sealed case 24 through the opening for bearing 69 or the escape of lubricant through the same opening. Some of the heat developed in the gear chamber 84 is transmitted to the walls via the lubricating fluid and this heat is dissipated by the snow moving into the impeller housing creating cold air, which snow and/or cold air moves in contact with the outer surface of the casing 24 and the fins 24d and 24c. Heat generated by the motor 23 in the motor chamber 85 is transferred from the stator 93 directly to the housing wall and via the air circulated within the casing to the internal fins 24c. This heat is also dissipated by the snow in the impeller chamber. In order to further promote heat transfer, a fan 110 (FIGS. 6 and 7) is mounted on the armature shaft 92 adjacent the bearing 91. The fan 110 rotates with the shaft 92 and circulates the air in the motor chamber 85 in contact with the internal fins 24c and 86a. Because the end wall 40 is integrally formed with the sealed casing 24, heat developed in the casing will transfer by conduction to the end wall 40 for dissipation by the inner and outer fins 40c and 40d, respectively.

In addition to the function of supporting the outer end of the armature shaft 92, the diametrically opposed arms 99b and 99d of bracket 99 (FIGS. 6 and 8) are each recessed to receive and support a brush assembly housing 111 (FIGS. 8, 9, 10, 11 and 12). To this end arms 99b and 99d are each provided with a V-shaped surface 112 (FIG. 10) perpendicular to the axis of commutator 97, against which surfaces the brush housing 111 are clamped by spring clips 113 secured to the arms 99b and 99d, respectively, by removable cap screws or bolts 114.

In order to provide electrical contact with the commutator 97, each housing 111 is provided with a brush chamber 115 open at the commutator end and closed at the opposite end by a wall portion 111a. Disposed within each brush chamber is a conventional brush 116 biased into engagement with the commutator 97 by a compression spring 117 interposed between each brush 116 and the closed end 111a of the housing 111 (FIG. 9). A suitable quick connector type terminal 118 is inserted between one end of each spring 117 and the housing wall 111a. As illustrated, each terminal 118 may have a protuberance 118a to engage this end of the associated compression spring, the other end of which receives a reduced cross section protrusion 116a of each brush 116. Preferably a flexible cable 119 is provided for interconnecting each brush 116 with its associated terminal 118. It will be understood that the springs 117 are longitudinally centered in their associated housings 115 by the protrusions 116a and protuberances 118a on the brushes 116 and terminals 118, respectively.

Figures 11, 12, 14:
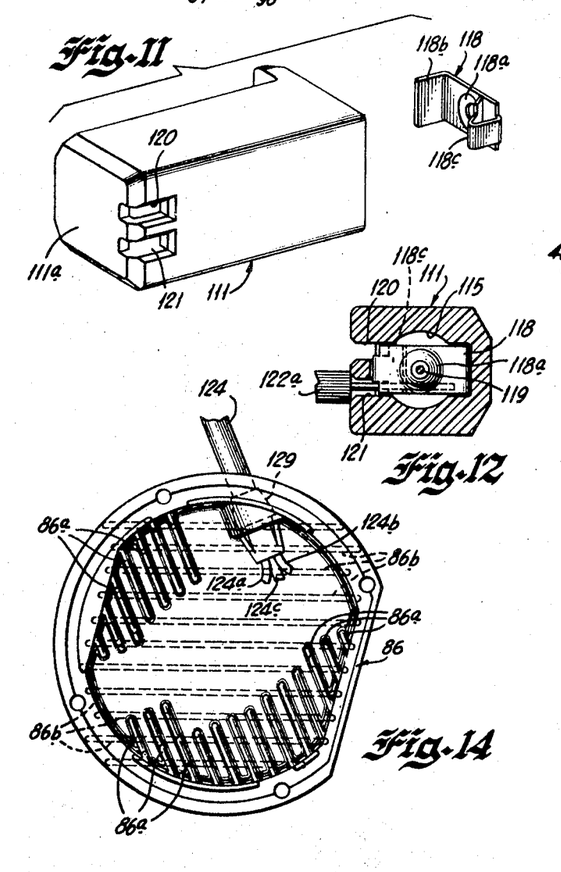
FIG. 11 is an enlarged exploded perspective view of a portion of the brush assembly illustrated in FIG. 10.
FIG. 12 is a fragmentary sectional view of the drive motor brush assembly taken substantially along line 12—12 of FIG. 8.
FIG. 14 is a side elevational view of the detachable cover member of the sealed casing and the electrical connection extending therethrough.

To make ready electrical connection with either of the terminals 118, they are constructed, as best shown in FIGS. 11 and 12 of the drawings, as of somewhat U shape including a leg 118b at one end and a resilient T-shaped clamping arm 118c at the other. The T-shaped clamping arm 118c has the head of the T inherently biased against the bight portion of the U-shaped terminal 118. Each housing 111 is provided with a pair of spaced openings 120 and 121 into one of which the terminal ends of electrical conductors such as 122a or 122b may be inserted whereby they will be clamped between the arms of the T head 118c and the bight portion of the terminal 118. As illustrated in FIG. 12, conductors 122a and 122b are inserted into slots 121 in the housings 111 for connection with the terminal 118 therein. These conductors 122a and 122b connect the motor windings to brushes 116. When a conductor is inserted through either the slots 121, a good electrical connection is automatically established between it and terminal 118 because of the springlike action of T-shaped clamping arm 118c which forces the conductor tightly against the bight portion of the terminal.

Opening 120 in each holder 111 does not receive a conductor but is provided so that a suitable tool may be inserted therein to release the clamping effect on conductors 122a or 122b, as the case may be, for disassembly. A power cord 124 (FIGS. 1, 3, 4 and 5) extends into the casing 24 from a control switch assembly 125 mounted on the upper handle 33 and is connected to the field leads 122a and 122b by a suitable connector. A three-wire cord 126 with a conventional three-terminal plug 127 at the outer end is connected to switch assembly 125 and the plug is adapted to be inserted into a suitable power receptacle to supply electrical power to the snow thrower 20. As illustrated in FIGS. 1 and 3, the cord 124 extends along one leg of the upper handle 33 and along a leg of the lower handle 32. The cord is secured to the respective handles by clips 128 (FIG. 3) and the lower end extends through a sealing grommet 129 molded in the cord and extending through the cover member 86 (FIG. 14). The individual conductors 124a and 124b of the cable 124 are connected internally of the sealed chamber 24 to the motor 23 through conductors 122a and 122b. The power cable or cord 124 also contains a third conductor 124c comprising a ground wire which is connected to a grounding lug 130 (FIG. 8) bolted to the interior of the casing 24 by means of a suitable screw 131. This ground connection insures that the entire metallic portion of the snow thrower 20 is grounded should a short circuit occur.

In view of the detailed description included above, it will be apparent that the snow thrower 20 of the present invention provides many advantages over previously known snow removal equipment. One such advantage is the unique drive arrangement between the motor 23 and impeller 21. In this arrangement the drive axle 73 serves as a means for supporting the impeller and, in addition, acts as a torsion bar to absorb shocks which would otherwise be transmitted through the gear train in the gear chamber 84 to the motor itself. In addition, the shear pin 78 acts as a safety means for reducing the impact on the motor and gear train should a foreign object become jammed between the impeller 21 and housing 22. Because the sealed casing 24 is within the impeller housing itself and also within the perforated drum 70, a unique and advantageous cooling relationship is established between the casing and the snow entering the housing. As the snow moves through the impeller chamber 36 some of it passes through the perforations 70' in the cylindrical drum 70 and into contact with the sealed casing walls 24a and 24b and the cooling fins 24d. In addition, air cooled by this snow is circulated within the confines of drum 70 by the turbulence created by the drum rotation. In addition, the end plate 40 with its inner and outer cooling fins provides for additional cooling, as does the cover member 86 with its fins 86a and 86b. The outer fins 40d and 86b are cooled by direct engagement with the snow. The motor 23 is totally enclosed within the sealed chamber 24, and the fan 110 provides for an even circulation of air throughout the chamber as the motor is running.

Should it be desired, for any reason, to service the interior of the sealed casing 24, the cover member 86 can be easily disassembled after removing the bolts 87. The conductors 122a and 122b and ground wire 124c are then disconnected so that armature and brush support bracket 99 is ready to be disassembled after the screws 100 have been removed. Should it be desirable or necessary to remove the stator 93, it can be accomplished after loosening the bolts 94. Once the stator 93 is withdrawn from the sealed casing, the divider plate 89 can easily be taken out by removing the cap screws 90, and the interior of the gear chamber 84 is then exposed. Because of the location of the sealed casing 24 within the impeller housing, and specifically because it is located within the cylindrical drum 70 of the impeller, a relatively large horsepower motor can be used without danger of overheating. Furthermore, the heat developed in the gear chamber 84 is readily dissipated because of its contact to the snow and cold air in the impeller housing 22. There is no danger of electrical shock with the snow thrower 20 because all of the electrical connections to the motor 23 from the cable 124 are completely sealed when the cover member 86 is in place. In view of the detailed description included above, the operation of the snow thrower 20 will readily be understood by those skilled in the art.

While there has been shown and described a particular embodiment of the present invention, it will be apparent to those skilled in the art that various changes and modifications may be made withoue departing from the invention in its broader aspects and it is, therefore, contemplated in the appended claims to cover all such changes and modifications as fall within the true spirit and scope of the present invention.

What is claimed as new and desired to be secured by Letters Patent of the United States is:

1. A drive unit for an electrical appliance comprising in combination a sealed casing and an electric motor therein, said casing including a cup-shaped member having a closed end and a removable cover for the opposite end of said member, said motor including a stator secured to said cup-shaped member and a rotor journaled for rotation with respect to said stator, means secured to said cup-shaped member for supporting one end of said rotor for rotation, removable bracket means adjacent the open end of said cup-shaped member for supporting the other end of said rotor, a removable divider wall within said cup-shaped member dividing said member into a motor chamber and a gear chamber, the gear chamber being adjacent said closed end, and fan means for circulating air within said motor chamber.

2. A drive unit for an electrical appliance comprising in combination a sealed casing and an electric motor therein, said casing including a cup-shaped member having a closed end and a removable cover for the opposite end of said member, said motor including a stator secured to said cup-shaped member and a rotor journaled for rotation with respect to said stator, means secured to said cup-shaped member for supporting one end of said rotor for rotation, removable bracket means adjacent the open end of said cup-shaped member for supporting the other end of said rotor, said bracket means including a plurality of support legs extending outwardly of said rotor, said legs including means adapted to be removably secured to the interior of said cup-shaped member inside said cover member and wherein said rotor includes a plurality of commutator segments adjacent said bracket means and including a pair of diametrically opposed brush assemblies mounted on said legs of said bracket means for electrical contact with said commutator segments, and a removable divider wall within said cup-shaped member dividing said member into a motor chamber and a gear chamber, the gear chamber being adjacent said closed end.

3. The drive unit of claim 2 including an electrical power cord extending into said casing through said cover member, said power cord including a plurality of insulated conductors, a separate conductor connected to each of said brush assemblies and another of said conductors connected to the interior of said casing.

4. The drive unit of claim 2 wherein said brush assemblies comprise a pair of diametrically opposed tubular insulating brush housings having closed outer ends, brush means slidably disposed in said housings adjacent the inner ends thereof, contact means in said housings adjacent the outer closed ends thereof, said contact means each including resilient conductor clamping portions, conductive spring means in each of said housings between said contact means and said brush means urging the latter inwardly against said commutator segments of said armature, and opening defining means in said housings adjacent the outer closed ends thereof permitting conductors to be inserted therethrough for engagement with said clamping portions.

5. The drive unit of claim 4 wherein said contact means are channel-shaped members with web portions juxtaposed against the closed end of said housing and a flange portion adjacent the opening defining means therein, said flange portion having openings therein for receiving a conductor inserted through said opening defining means in said housing, said channel-shaped member including means defining said clamping portions, said last-mentioned means being joined to said flange portion and extending toward said web portion to hold an inserted conductor tightly against said web portion.

References Cited

UNITED STATES PATENTS

| | | | |
|---|---|---|---|
| 945,988 | 1/1910 | Simonds | 310—66 |
| 1,871,835 | 8/1932 | Batchelder | 310—83 |
| 2,958,794 | 11/1960 | Mann | 310—83 |
| 3,310,691 | 3/1967 | Wilkinson | 310—42 |

MILTON O. HIRSHFIELD, Primary Examiner

L. L. SMITH, Assistant Examiner

U.S. Cl. X.R.

310—242